US009802349B2

United States Patent
Jang et al.

(10) Patent No.: US 9,802,349 B2
(45) Date of Patent: Oct. 31, 2017

(54) WAFER LEVEL TRANSFER MOLDING AND APPARATUS FOR PERFORMING THE SAME

(71) Applicant: Taiwan Semiconductor Manufacturing Company, Ltd., Hsin-Chu (TW)

(72) Inventors: Bor-Ping Jang, Chu-Bei (TW); Yeong-Jyh Lin, Caotun Township (TW); Chien Ling Hwang, Hsin-Chu (TW); Chung-Shi Liu, Hsin-Chu (TW); Meng-Tse Chen, Changzhi Township (TW); Ming-Da Cheng, Jhubei (TW); Chen-Hua Yu, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 469 days.

(21) Appl. No.: 14/302,728

(22) Filed: Jun. 12, 2014

(65) Prior Publication Data

US 2014/0291881 A1    Oct. 2, 2014

Related U.S. Application Data

(63) Continuation-in-part of application No. 13/411,293, filed on Mar. 2, 2012, now Pat. No. 8,951,037.

(51) Int. Cl.
*B29C 45/34* (2006.01)
*B29C 45/00* (2006.01)
(Continued)

(52) U.S. Cl.
CPC .......... *B29C 45/34* (2013.01); *B29C 45/0046* (2013.01); *B29C 45/14655* (2013.01);
(Continued)

(58) Field of Classification Search
CPC .......... B29C 45/0046; B29C 45/14655; B29C 45/34; B29C 2045/14852; B29C 2045/1495
See application file for complete search history.

(56) References Cited

U.S. PATENT DOCUMENTS 3,108,339 A * 10/1963 Bucy ...................... B22D 17/14
164/254
5,540,576 A * 7/1996 Kawakita .............. B29C 33/005
264/102

(Continued)

FOREIGN PATENT DOCUMENTS

CN    102005440 A    4/2011
JP    2000040773 A    2/2000
(Continued)

*Primary Examiner* — James Sanders
(74) *Attorney, Agent, or Firm* — Slater Matsil, LLP

(57) ABSTRACT

A method includes placing a package structure into a mold chase, with top surfaces of device dies in the package structure contacting a release film in the mold chase. A molding compound is injected into an inner space of the mold chase through an injection port, with the injection port on a side of the mold chase. During the injection of the molding compound, a venting step is performed through a first venting port and a second venting port of the mold chase. The first venting port has a first flow rate, and the second port has a second flow rate different from the first flow rate.

19 Claims, 13 Drawing Sheets

(51) Int. Cl.
  *B29C 45/14* (2006.01)
  *B29L 31/34* (2006.01)
(52) U.S. Cl.
  CPC ............... *B29C 2045/0027* (2013.01); *B29L 2031/3425* (2013.01)

(56) References Cited

U.S. PATENT DOCUMENTS

| | | |
|---|---|---|
| 5,964,030 A | 10/1999 | Lee et al. |
| 6,245,595 B1 * | 6/2001 | Nguyen ............... H01L 21/563 228/180.22 |
| 6,302,674 B1 | 10/2001 | Arakawa et al. |
| 6,770,236 B2 | 8/2004 | Miyajima |
| 6,797,542 B2 | 9/2004 | Kuratomi et al. |
| 7,482,701 B2 | 1/2009 | Ito et al. |
| 7,943,078 B2 | 5/2011 | Sekido et al. |
| 8,743,561 B2 | 6/2014 | Wang et al. |
| 2007/0235897 A1 | 10/2007 | Brunnbauer et al. |
| 2011/0003026 A1 | 1/2011 | Matsumoto |
| 2012/0146236 A1 | 6/2012 | Lin et al. |
| 2013/0115735 A1 | 5/2013 | Chen et al. |
| 2013/0228950 A1 | 9/2013 | DeSimone et al. |

FOREIGN PATENT DOCUMENTS

| | | |
|---|---|---|
| JP | 2012200996 A | 10/2012 |
| KR | 20060134105 A | 12/2006 |

* cited by examiner

WAFER LEVEL TRANSFER MOLDING AND APPARATUS FOR PERFORMING THE SAME

PRIORITY CLAIM AND CROSS-REFERENCE

This application is a continuation-in-part application of the following commonly-assigned U.S. patent application Ser. No. 13/411,293, filed Mar. 2, 2012, and entitled "Wafer-Level Underfill and Over-Molding;" which application is hereby incorporated herein by reference.

BACKGROUND

In the packaging of integrated circuits, package components, such as device dies and package substrates, are typically stacked through flip chip bonding. To protect the stacked package components, a molding compound is disposed surrounding the device die.

The conventional molding methods include compression molding and transfer molding. Compression molding may be used for over-molding. Since the compression molding cannot be used to fill the gaps between the stacked dies, the underfill needs to be dispensed in separate steps from the compression molding. On the other hand, transfer molding may be used to fill a molding underfill into the gap between, and over, the stacked package components. Accordingly, transfer molding may be used to dispense the underfill and the molding compound in the same step. Transfer molding, however, cannot be used on the packages including round wafers due to non-uniform dispensing of the molding compound.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
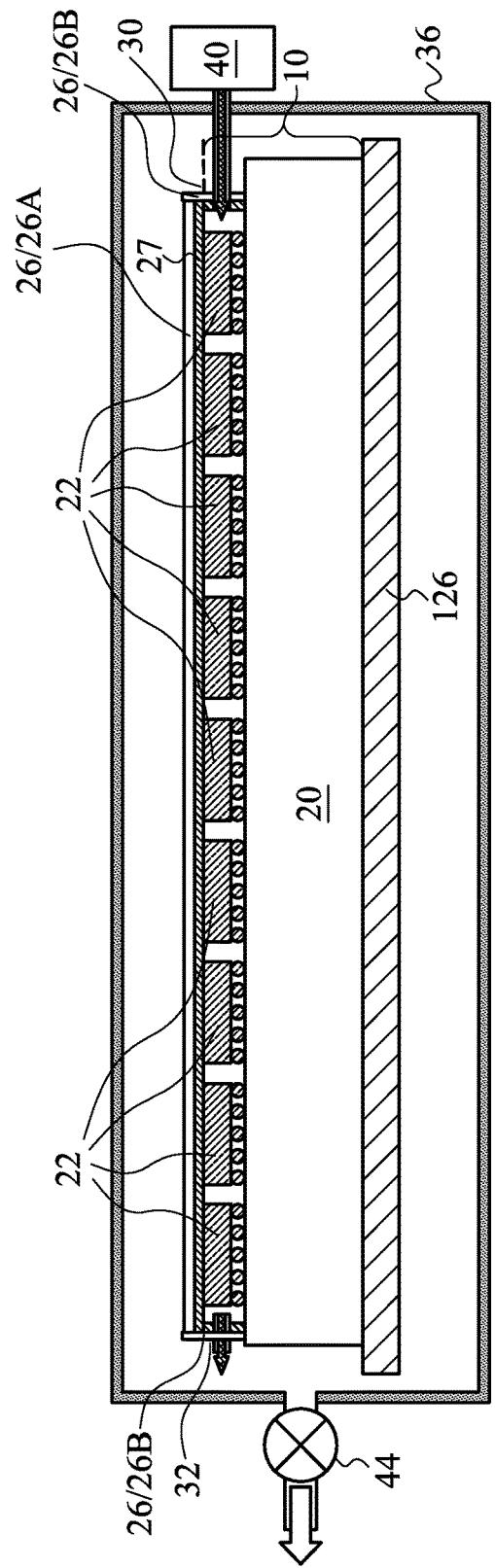
FIG. 1 illustrates a cross-sectional view of a wafer-level transfer molding process in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms such as "underlying," "below," "lower," "overlying," "upper," and the like may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

An apparatus for wafer-level transfer molding process and the method of performing the wafer-level transfer molding are provided in accordance with various exemplary embodiments of the present disclosure. The variations of the embodiments are discussed. Throughout the various views and illustrative embodiments, like reference numbers are used to designate like elements.

Figure 2:
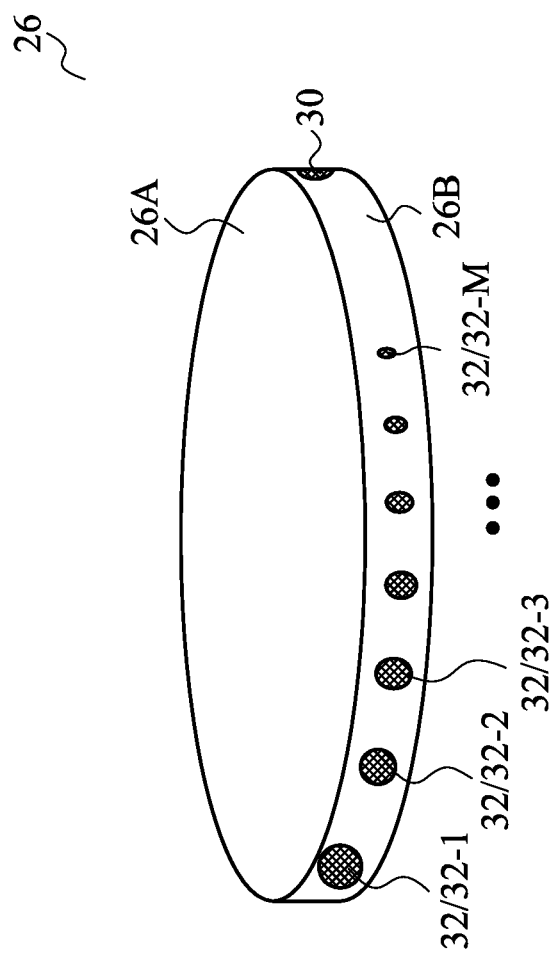
FIG. 2 illustrates a perspective view of a mold chase in accordance with some embodiments.

FIG. 1 illustrates a cross-sectional view of a wafer-level transfer molding process in accordance with some embodiments of the present disclosure. Referring to FIG. 1, package structure 10 is placed in mold chase 26. Package structure 10 includes wafer 20 and dies 22 bonded to wafer 20. In some embodiments, wafer 20 is a device wafer, which includes a plurality of device chips, including active devices (such as transistors) therein. The device wafer 20 may also include passive devices such as resistors, capacitors, inductors, and/or transformers therein. Wafer 20 also includes a semiconductor substrate (not shown) such as a silicon substrate, a silicon germanium substrate, a silicon carbon substrate, or a III-V compound semiconductor substrate. In alternative embodiments, wafer 20 is an interposer wafer, which is free from active devices therein. In the embodiments where wafer 20 is an interposer wafer, wafer 20 may also include a semiconductor substrate. The interposer wafer 20 may or may not include passive devices such as resistors, capacitors, inductors, and/or transformers therein. The top view of wafer 20 may be rounded, for example, as shown in FIG. 2, although wafer 20 may have other top-view shapes such as rectangular shapes. Device dies 22 may include active devices therein. In accordance with some embodiments, device dies 22 include memory dies such as Static Random Access Memory (SRAM) dies, Dynamic Random Access Memory (DRAM) dies, and the like. Alternatively, dies 22 may be packages including stacked dies.

Mold chase 26 includes top portion (a cover) 26A, which may have a round top-view shape (FIGS. 2 through 9). As shown in FIG. 1, release film 27, which is made of a flexible material, is attached to the inner surface of mold chase 26. The top surfaces of dies 22 are in contact with the bottom surface of release film 27. Accordingly, there is no space left on the top surfaces of dies 22. Release film 27 may also extend to the inner sidewalls of mold chase 26 in accordance with some embodiments. On the other hand, the gaps between neighboring dies 22 remain unfilled by release film 27. Accordingly, in the molding process, the subsequently dispensed molding compound flows through the gaps between neighboring dies 22, and possibly in the gaps between dies 22 and the underlying wafer 20, but not over dies 22. Not allowing the molding compound to flow over the dies 22 results in narrow molding compound paths since the gaps between dies 22 are narrow. This results in an increase in difficulty of the molding process, and hence the schemes illustrated in FIGS. 4 through 10 are used in accordance with the embodiments of the present disclosure to ensure efficient and uniform molding.

Mold chase 26 further includes edge ring 26B (also refer to FIG. 2), which encircles dies 22. Edge ring 26B is connected to, and extends down from, the edges of top portion 26A. Edge ring 26B encircles a region underlying top portion 26A, the region which is referred to as the inner space of mold chase 26 hereinafter. Accordingly, dies 22 and release film 27 are located in the inner space of mold chase 26. Mold chase 26 may be formed from aluminum, stainless steel, ceramic, or the like. The bottom ends of edge ring 26B may be in contact with the top surface of wafer 20 so that the inner space of mold chase 26 is sealed.

In some embodiments, as shown in FIG. 1, mold chase 126, which is a lower mold chase, is placed under mold chase 26. Mold chases 26 and 126 may be used in combination for molding package 10. In alternative embodiments, lower mold chase 126 is not used. In accordance with alternative embodiments of the present disclosure, the bottom edge of edge ring 26B is placed on the edge portions of wafer 20. In these embodiments, no lower mold chase is used.

FIG. 1 further illustrates molding injection port 30 and venting port 32, which are on opposite sides of mold chase 26. In addition, molding injection port 30 and venting port 32 are on edge ring 26B and include openings that connect the inner space of mold chase 26 to the outer space outside of mold chase 26. Since FIG. 1 is a cross-sectional view, a single venting port 32 is illustrated. A plurality of venting ports 32, however, may be placed on edge ring 26B, as illustrated in FIGS. 2 through 8. Molding dispenser 40 is connected to molding injection ports 30 and is configured to conduct molding material 46 to molding injection ports 30. Molding dispenser 40 may include a storage tank (not shown) for storing molding material 46.

FIG. 2 illustrates a perspective view of mold chase 26. In some embodiments, venting ports 32 (including 32-1 through 32-$m$) have a uniform size, wherein the sizes may be the diameters or lengths/widths, depending on the shapes of venting ports 32. For example, venting ports 32 have round openings or octagonal openings. In alternative embodiments, venting ports 32 have different sizes, and the sizes of venting ports 32 are related to where the respective venting ports 32 are located.

Figure 3:
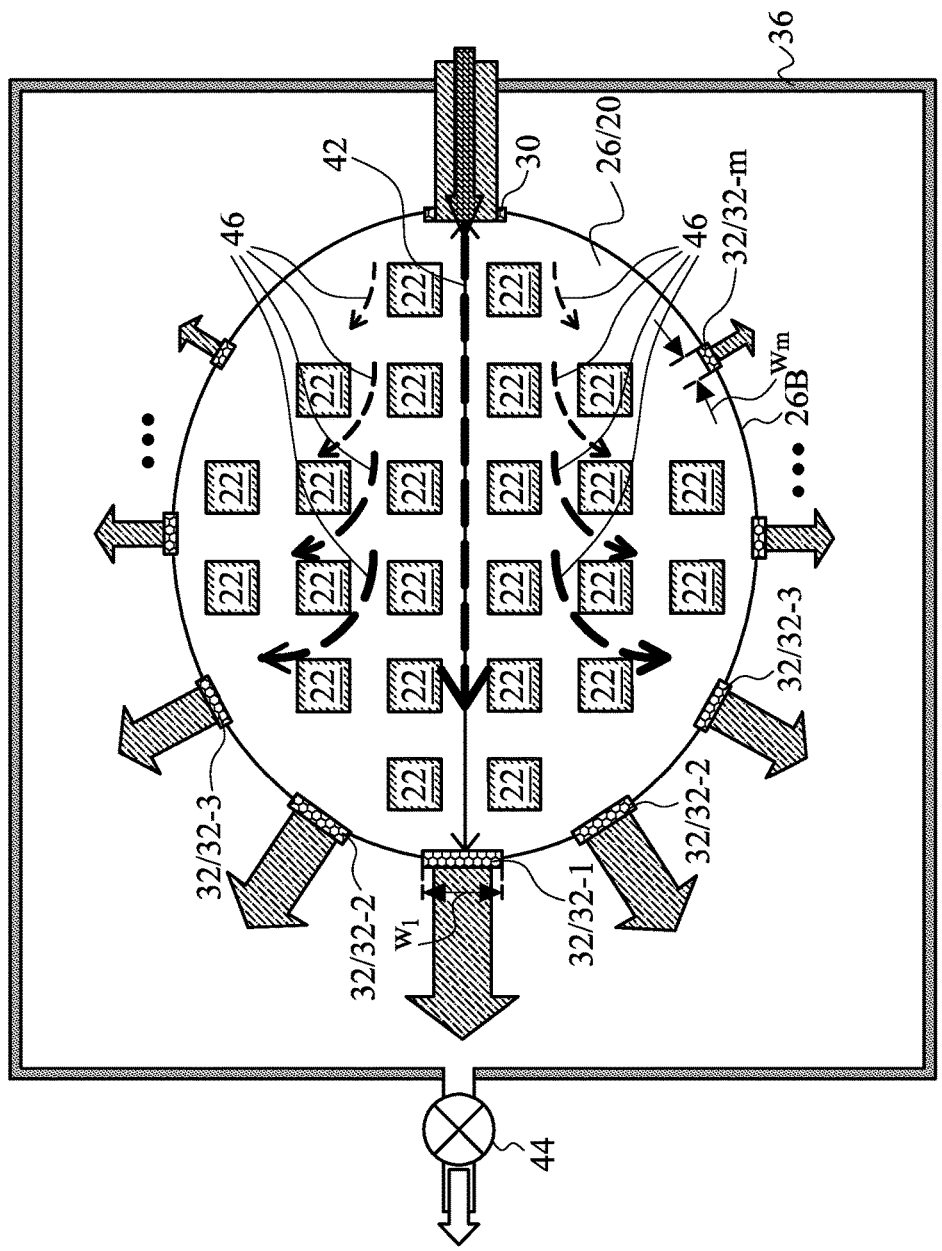
FIG. 3 illustrates the top view of a wafer-level transfer molding process in accordance with some embodiments with venting ports having different sizes.

Through venting ports 32, the inner space inside mold chase 26 may be vacuumed. For example, pipes 52 (FIG. 4) may be connected to venting ports 32, and the vacuuming may be performed through pipes 52. Alternatively, as shown in FIGS. 1 and 3, the entire mold chase 26 and the respective package structure 10 are placed in vacuumed environment 36, which may be a chamber, so that all venting ports 32 are used for vacuuming the inner space of mold chase 26 at the same time. In the embodiments wherein vacuumed environment 36 is provided, there may not be pipes connected to individual venting ports 32. Through venting ports 32 having different sizes, molding material 34 may be dispensed more uniformly throughout wafer 20.

FIG. 3 illustrates a top view of mold chase 26, wafer 20, and dies 22 in accordance with some embodiments. As shown in FIG. 3, dies 22 separate the inner space of mold chase 26 into a plurality of horizontal and vertical streets, wherein in the subsequent molding process, molding compound flows through the streets and the gaps between dies 22 and wafer 20. Molding injection port 30 and venting port 32-1 may be on the opposite sides of edge ring 26B. Venting ports 32 may be disposed symmetrical to diameter 42 of edge ring 26B, wherein diameter 42 has molding injection port 30 as one of the two ends. In some embodiments, venting port 32-1 is at the other end of diameter 42. In alternative embodiments (not shown) of the present disclosure, there is no venting port 32 at the other end. Rather, two venting ports are symmetrical to the other end of diameter 42 and are closer to the other end of diameter 42 than all other venting ports 32.

As shown in FIG. 3, venting ports 32 are denoted as 32-1 through 32-$m$, wherein m is the sequence number that can be any integer equal to or greater than 2. For convenience, a venting port 32 may be referred to as venting port 32-$n$, wherein integer n is the sequence number and ranges from 1 to m, as illustrated in FIG. 3. With the increase in the sequence number n, the distance from venting port 32-$n$ to molding injection port 30 reduces. In accordance with some embodiments, each of the venting ports with sequence number (n+1) has a size/area equal to or smaller than the size/area of the venting port with sequence number n. Venting ports 32-1 through 32-$m$ may have increasingly smaller sizes. For example, in some embodiments, the sizes/areas of each venting port 32-($n$+1) are greater than the sizes/areas of all venting ports 32-1 through 32-$n$. Accordingly, venting port 32-1 may have the greatest size W1 among all sizes of venting ports 32. Venting port 32-$m$, which is closest to molding injection port 30, may have the smallest size Wm. In some embodiments, ratio W1/Wm is greater than 1 and may be greater than about 5.

It is appreciated that the sizes of venting ports 32 may be directly related to the flow rate of gases through venting ports 32 since they share the same pressure of environment 36 and the same pressure of the inner space of mold chase 26. Hence, venting ports 32-1 through 32-$m$ may have increasingly smaller flow rates of gas with the increase in the sequence number of the respective venting ports 32. Furthermore, venting port 32-1 may have the highest flow rate, and venting port 32-$m$ may have the lowest flow rate.

In the embodiments in FIG. 3, venting ports 32 may not be directly connected to any pump or valve, and the venting through venting ports 32 is caused by the pressure difference between vacuum environment 36 and the inner space of mold chase 26. Vacuum environment 36, on the other hand, may be vacuumed through pump 44 (FIGS. 1 and 3).

In accordance with some embodiments, a molding process includes pumping gas/air out of environment 36, for example, through pump 44, since mold chase 26 is placed in environment 36, and venting ports 32 connect the inner space of mold chase 26 to environment 36. Hence, when molding compound 46 (represented by arrows) is injected into the inner space of mold chase 26, the vacuum in the inner space causes molding compound 46 to be pulled forward and fill the gaps between dies 22 and the gaps between dies 22 and wafer 20. In these embodiments, no pump and valve is connected to venting ports 32 directly.

As also shown in FIG. 3, during the injection of molding compound 46, since venting ports 32 have different sizes, the flow of molding compound 46 is affected. For example, the path from mold injection port 30 to venting port 32-1 is longer than from any other venting ports 32. Hence, the greatest venting size of venting port 32-1 helps molding compound 46 to flow to venting port 32-1 faster than to other venting ports 32. The design of venting ports 32 results in a uniform distribution of molding compound 46 to all parts of the inner space of mold chase 26 so that molding compound 46 may reach all of the inner space of mold chase 26 in a more synchronized way than if all of the venting ports 32 have the same sizes.

FIGS. 4 through 9 illustrate cross-sectional views of intermediate stages in the formation of a molding process and the respective apparatus in accordance with alternative embodiments. Unless specified otherwise, the materials and the formation methods of the components in these embodiments are essentially the same as their like components, which are denoted by like reference numerals in the embodiments shown in FIGS. 1 through 3. The details regarding the process and the materials of the components shown in FIGS. 4 through 9 may thus be found in the discussion of the embodiment shown in FIGS. 1 through 3.

Figure 4:
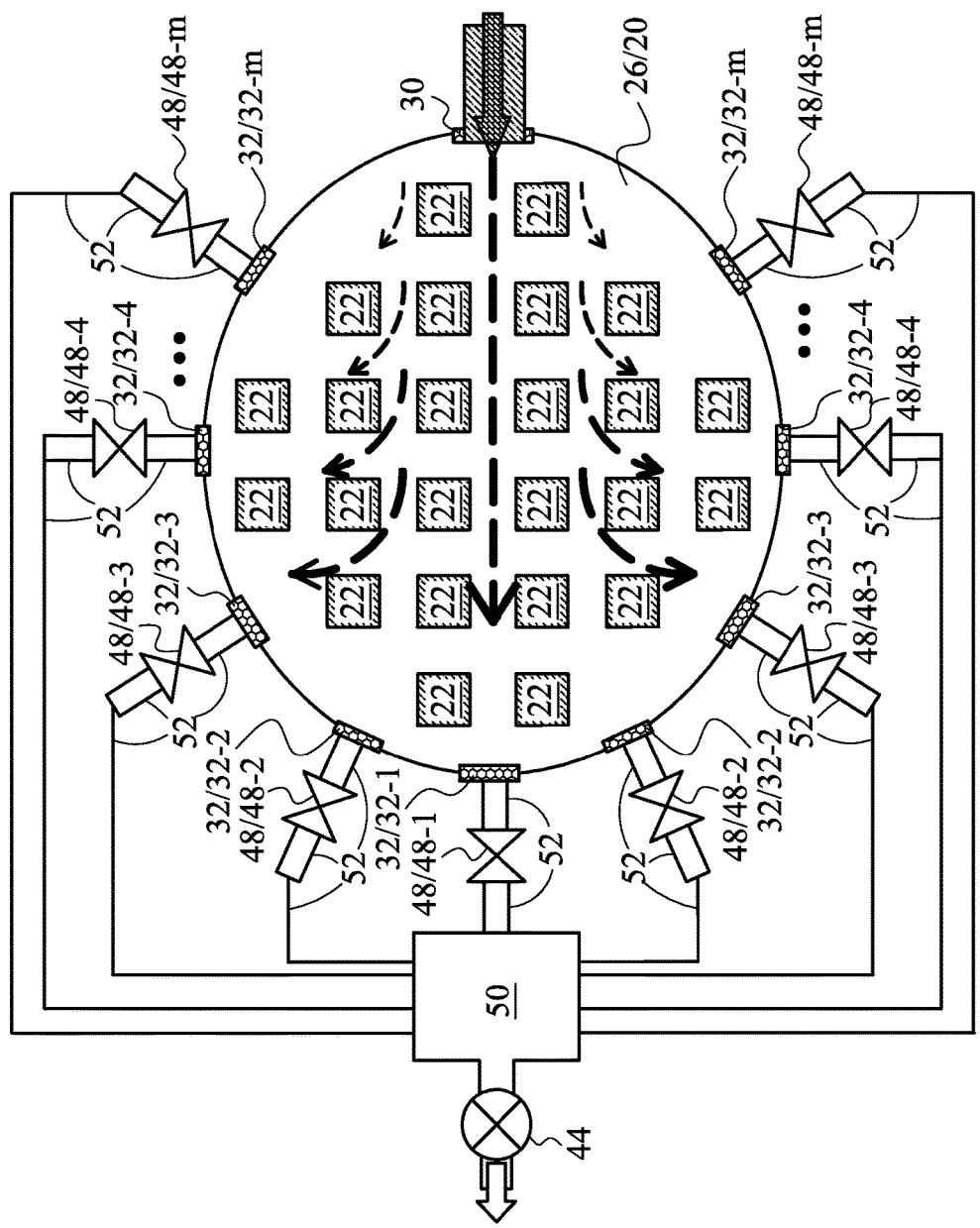
FIG. 4 illustrates the top view of a wafer-level transfer molding process in accordance with alternative embodiments, with valves connected to different venting ports that open differently.

FIG. 4 illustrates a top view of mold chase 26, wafer 20, and dies 22 in accordance with alternative embodiments. In these embodiments, rather than venting through a commonly shared environment 36 (as in FIG. 3), a plurality of valves 48, which are denoted as 48-1 through 48-*m*, are connected to the respective venting ports 32-1 through 32-*m*. In some embodiments, venting ports 32-1 through 32-*m* have the same size/area. In alternative embodiments, venting ports 32-1 through 32-*m* have different sizes and areas, and with the increase in sequence number, the respective venting ports 32 may have increasingly smaller sizes.

In accordance with the embodiments of the present disclosure, venting ports 32 are connected to chamber 50 through the respective valves 48 and pipes 52, with some of pipes 52 represented using lines. Chamber 50 is vacuumed, for example, through pump 44. Accordingly, chamber 50 has a low pressure, for example, lower than about 10 torr. Valves 48 are opened differently in order to have different opening sizes so that the gas flow passing through different valves 48 are different. In accordance with some embodiments, with the increase in the sequence number, the openings (or apertures or the diameters of the openings) of the respective valves 48-1 through 48-*m* are increasingly smaller. Alternatively stated, with the increase in the sequence number, the flow rates of the respective valves 48-1 through 48-*m* are increasingly smaller.

As a result of the different flow rates of valves 48-1 through 48-*m*, molding compound 46 is pulled faster in the direction toward venting port 32-1 than other venting ports. Furthermore, from venting port 32-1 to venting port 32-*m*, the flowing speed of molding compound 46 is increasingly smaller to compensate for the increasingly smaller distances from the respective venting ports 32 to molding injection port 30. As a result, molding compound 46 may be filled into different portions of the inner space of mold chase 26 at the same time.

Figure 5:
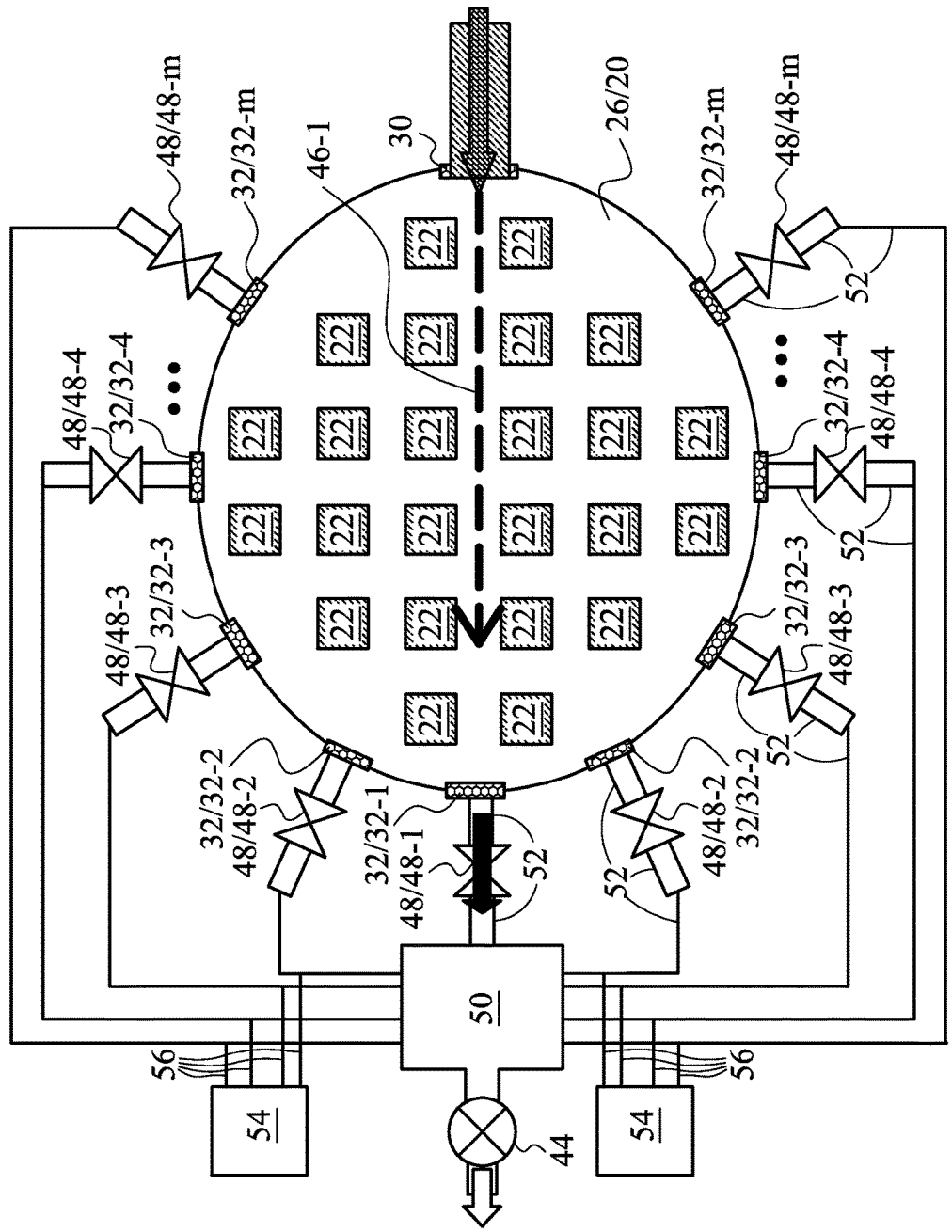
FIGS. 5 through 9 illustrate top views of intermediate stages in a time-lag wafer-level transfer molding process in accordance with some embodiments.

FIGS. 5 through 9 illustrate the top views of the intermediate stages in the molding of package structure 10 in accordance with alternative embodiments. Referring to FIG. 5, a plurality of valves 48, which are denoted as 48-1 through 48-*m*, are connected to the respective venting ports 32-1 through 32-*m*. Venting ports 32-1 through 32-*m* may have the same size or may have sizes different from each other. The plurality of venting ports 32 are connected to vacuum chamber 50 through valves 48-1 through 48-*m*. Valves 48 are also connected to, and are controlled by, controller 54, which is configured to control each of the valves 48 to open and close at desirable time points. The electrical connections from controller 54 to valves 48 are illustrated as 56.

Referring to FIG. 5, molding compound 46 is injected into mold chase 26. At a first time point T1, valve 48-1 is opened so that air is vented through valve 48-1, as indicated by the arrow drawn on valve 48-1. All other valves 48-2 through 48-*m* remain closed. Time point T1 may be the same time point that molding compound 46 starts to be injected into mold chase 26. Alternatively, time point T1 precedes or lags behind the time point molding compound 46 starts to be injected into mold chase 26. Accordingly, as shown in FIG. 5, molding compound 46 flows mainly in a single direction marked using arrow 46-1, which is the direction parallel to the direction pointing from molding injection port 30 to venting port 32-1. At this time, the flow of molding compound 46 to venting ports other than venting port 32-1 is minimal.

Figure 6:
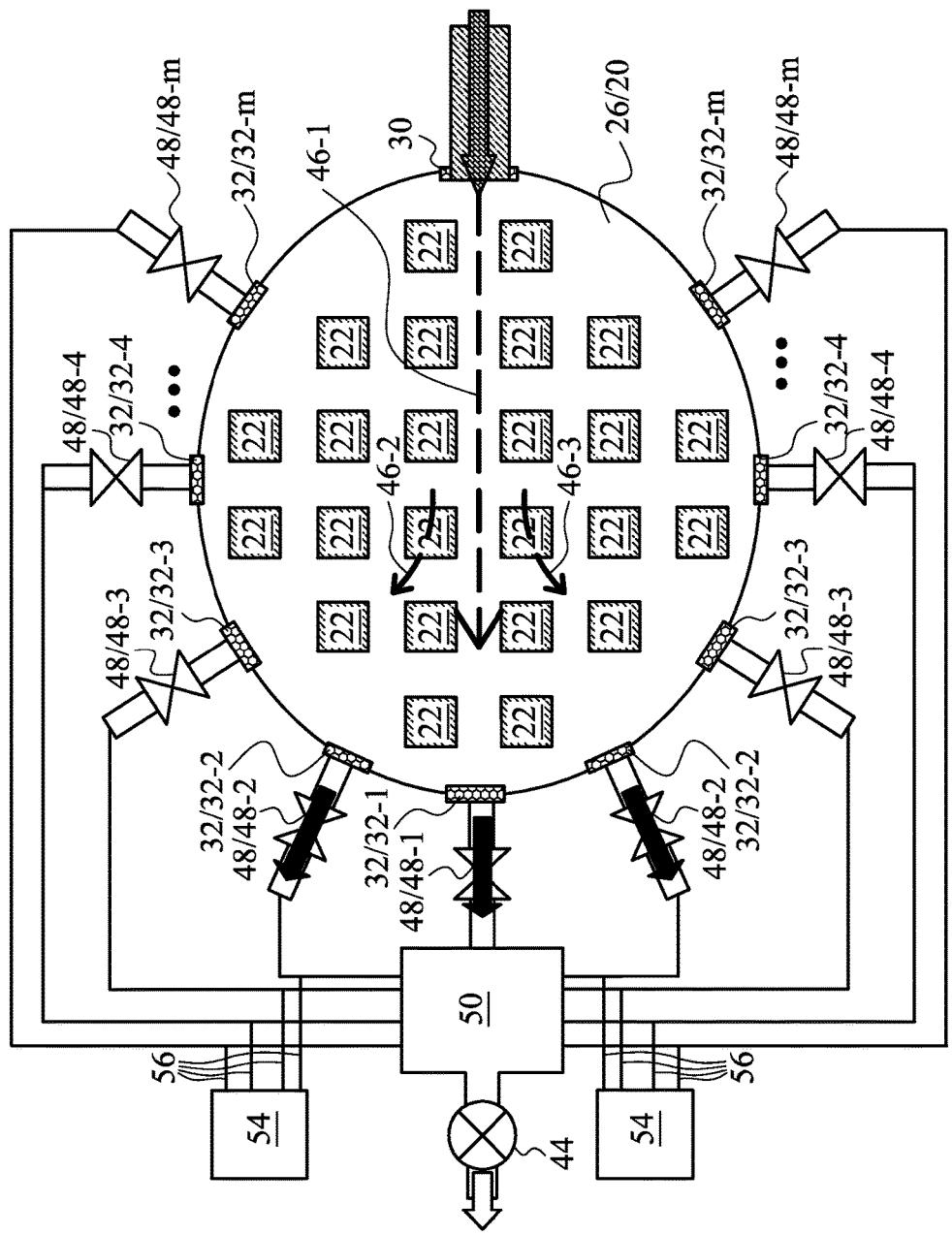

Referring to FIG. 6, at a second time point T2, which is after the first time point T1, valves 48-2 are opened. Valve 48-1 remains open so that air is vented through valves 48-1 and 48-2 at the same time, as indicated by the arrows drawn on valves 48-1 and 48-2. Valves 48-1 and 48-2 may be controlled so that the flow rate of venting port 32-1 is the same as, greater than, or lower than, venting port 32-2. All other valves 48-3 through 48-*m* remain closed. Accordingly, as shown in FIG. 6, molding compound 46 flows mainly in directions marked using arrows 46-1 and 46-2. At this time, the flow of molding compound 46 to venting ports other than venting ports 32-1 and 32-2 is minimal. The time difference between time points T1 and T2 is affected by various factors including but not limited to the viscosity of molding compound 46, the size of the gaps between dies 22, the sizes of valves 48, and the power of pump 44.

Figure 7:
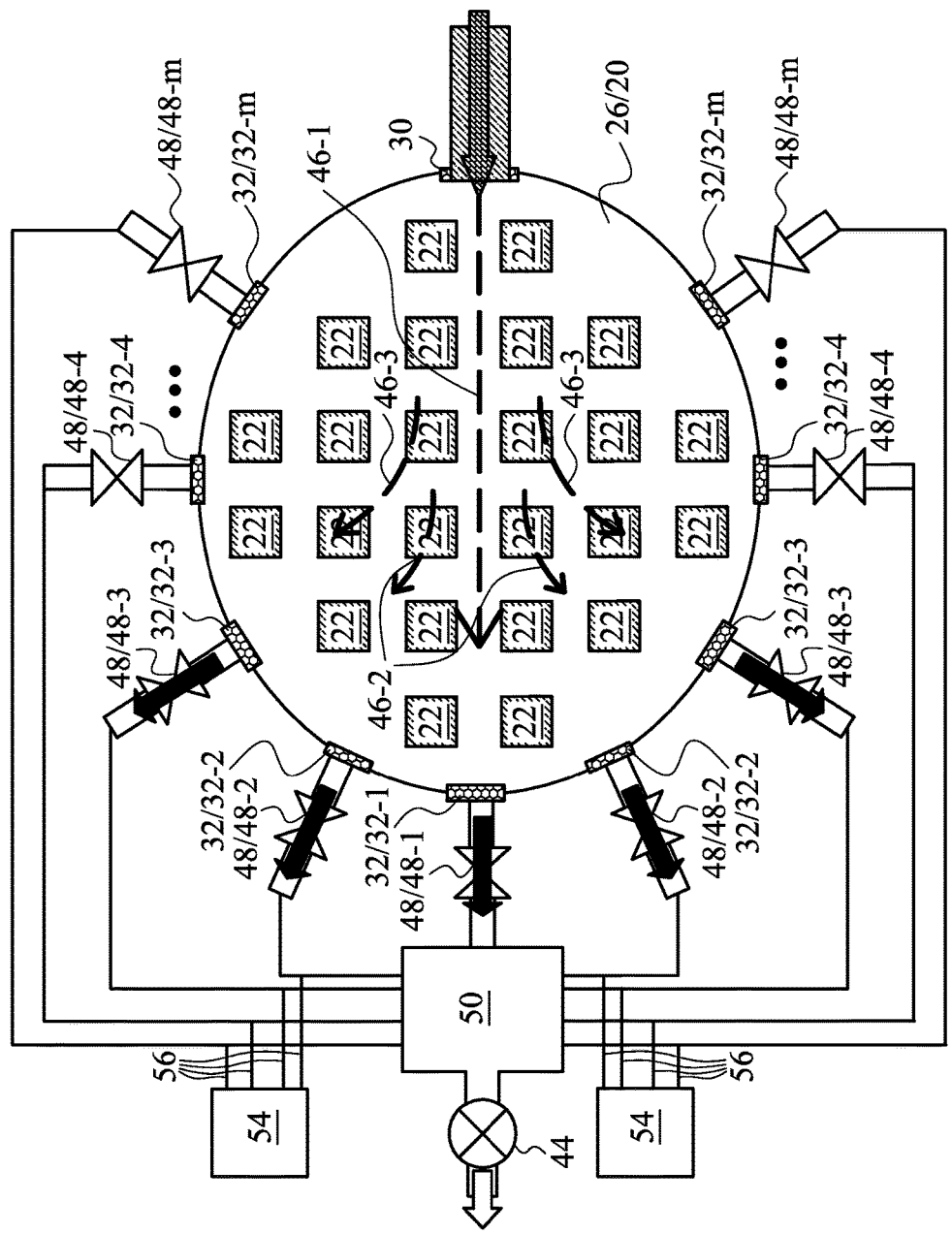
Figure 8:
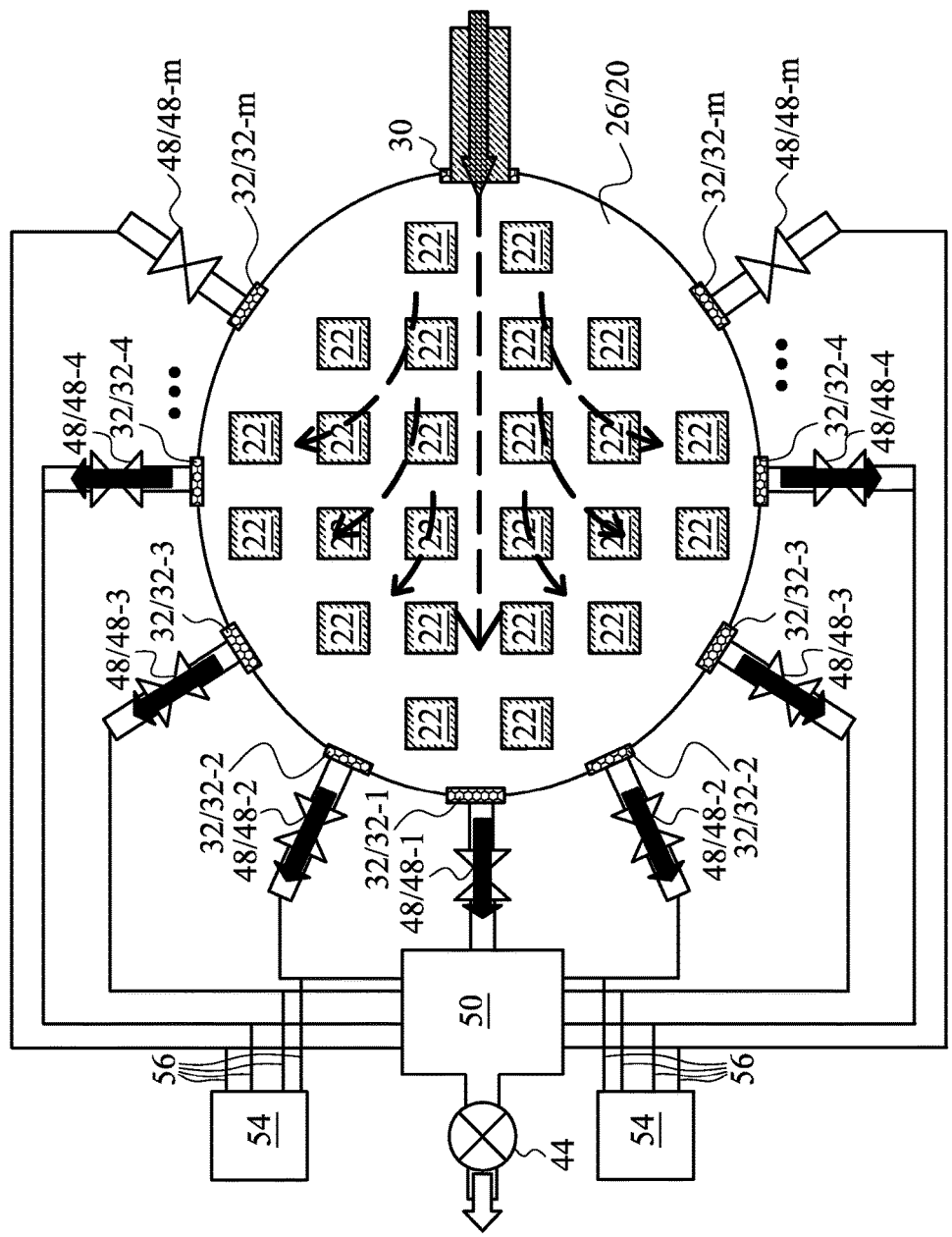

Next, as shown in FIG. 7, at a third time point T3, which is after the second time point T2, valves 48-3 are opened. Valves 48-1 and 48-2 remain opened so that air is vented through valves 48-1, 48-2, and 48-3, as indicated by the arrows drawn on valves 48-1, 48-2, and 48-3. Valves 48-1, 48-2, and 48-3 may be controlled so that the flow rate of venting port 32-1 is the same as, greater than, or lower than, venting ports 32-2 and/or 32-3. All other valves 48 other than valves 48-1, 48-2, and 48-3 remain closed. Accordingly, as shown in FIG. 7, molding compound 46 flows mainly in directions marked using arrows 46-1, 46-2, and 46-3. At this time, the flow of molding compound 46 to venting ports 32 other than venting ports 32-1, 32-2, and 32-3 is minimal. The time difference between time points T2 and T3 is affected by different factors including the viscosity of molding compound 46, the size of the gaps between dies 22, the sizes of valves 48, and the power of pump 47. The optimum time difference (T3−T2) can thus be found through experiments.

Figure 9:
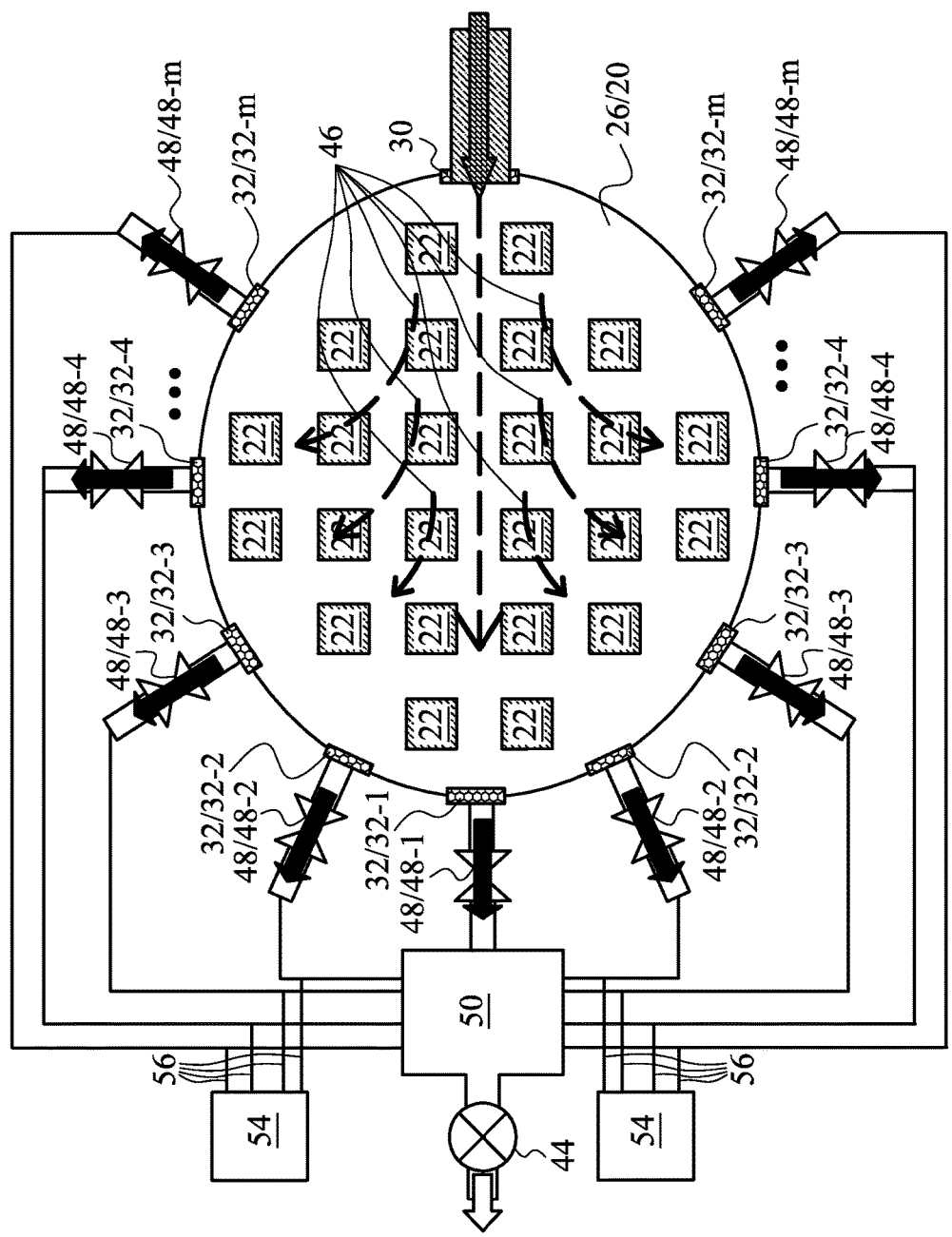

In subsequent steps, valves 48-4 through 48-*m* are opened sequentially, with each of valves 48 being opened after the opening time of the valves that have smaller sequence numbers. For example, referring to FIG. 8, at time point T4, which is after the third time point T3, valves 48-4 are opened. The sequential turning-on of valves 48 continues until time point Tm, when valves 48-*m* are opened, as shown in FIG. 9. At this time, molding compound 46 may not have filled the inner space of mold chase 26 entirely. After the time point Tm, all valves 48-1 through 48-*m* remain open, and the injection of molding compound 46 continues until molding compound 46 fully fills molding chase 26 (possibly including the gaps between dies 22 and wafer 20).

The lagging of each of time points T2 through Tm relative to its preceding time points is controlled by controller 54, wherein the optimum time points T1 through Tm may be found through experiments and may be used for the same types of products as long as the design of the molded package structure and the type of molding compound remains unchanged.

Figure 10:
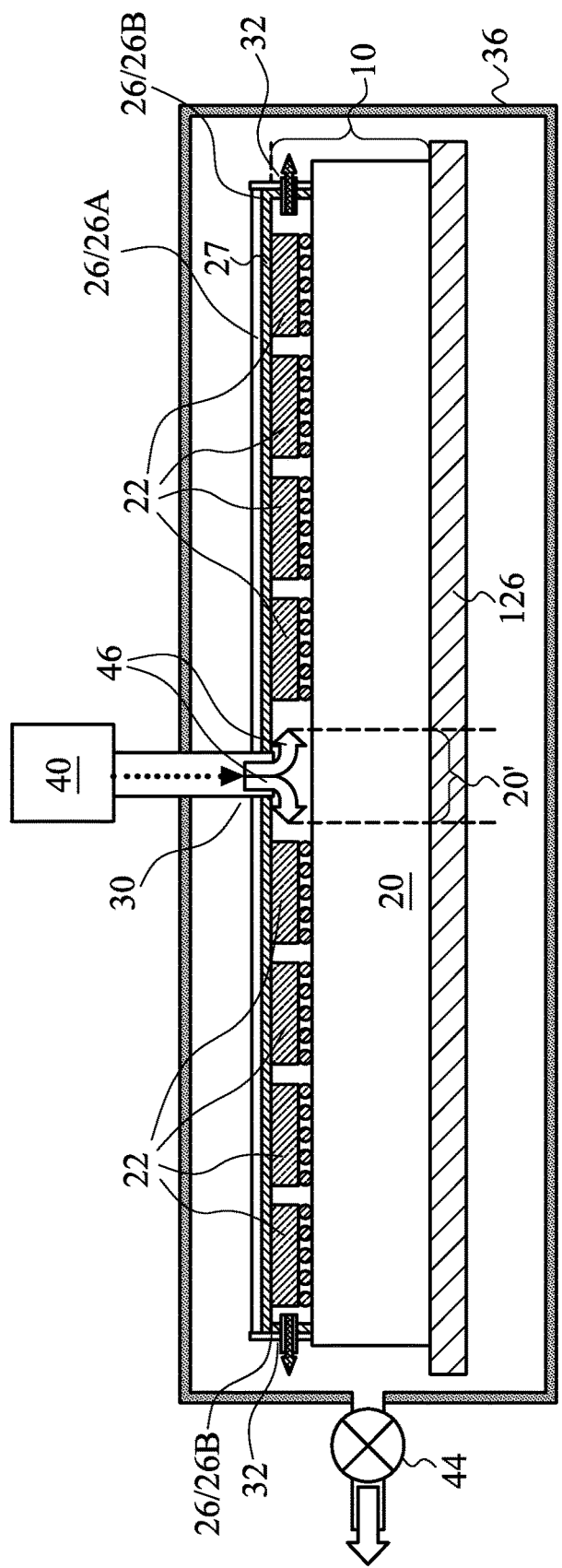
FIG. 10 illustrates the top view of a wafer-level transfer molding process in accordance with alternative embodiments.

FIG. 10 illustrates the molding process in accordance with alternative embodiments of the present disclosure. In these embodiments, instead of having molding injection port 30 on the side of mold chase 26, molding injection port 30 is on the top portion 26A of mold chase 26. Venting ports 32 are distributed on edge ring 26B and may be distributed uniformly so that venting ports 32 have uniform spacing from each other. Furthermore, in these embodiments, release film 27 contacts the top surfaces of dies 22, and hence molding compound flows through the gaps between dies 22 and the gaps between dies 22 and wafer 20, but not over dies 22.

As shown in FIG. 10, in order to allow molding compound 46 to be introduced into mold chase 26, the center chip 20' in wafer 20 does not bond with an overlying die 22, hence allowing a space for molding compound 46 to be conducted into mold chase 26. Furthermore, mold chase 26 may be placed in vacuum environment 36, which is connected to pump 44 for evacuating air out of vacuum environment 36.

Figure 11:
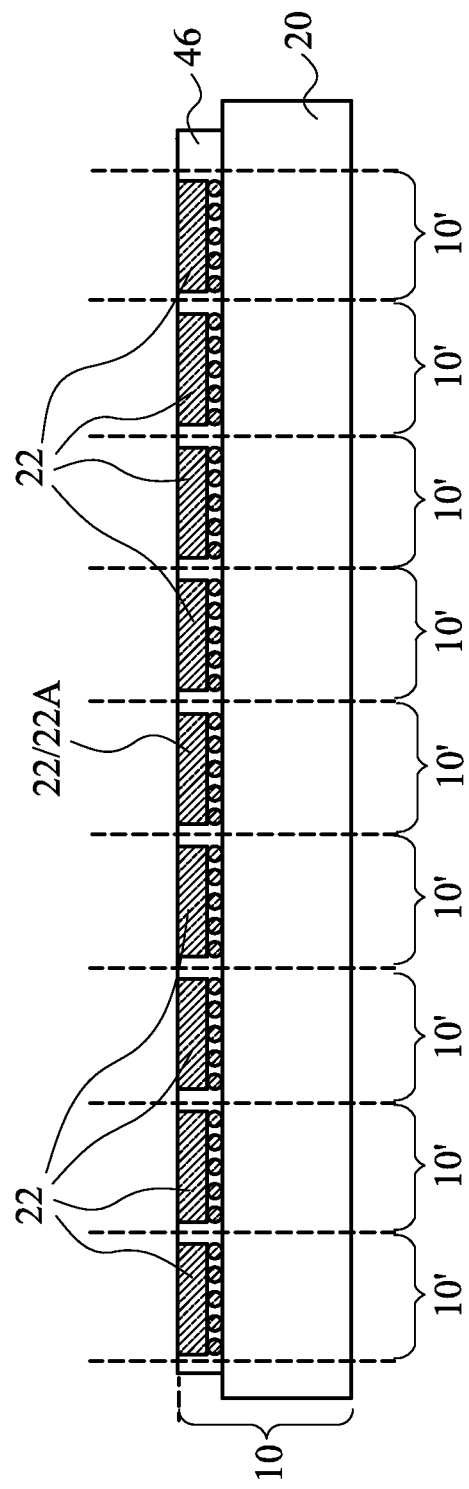
FIG. 11 illustrates a molded package structure in accordance with some embodiments.

After the molding injection step occurs as shown in FIG. 3, 4, 9, or 10, molding compound 46 fully fills the inner space of mold chase 26. Next, a curing process is performed to solidify molding compound 46. Depending on the type of molding compound 46, the curing may be performed through Ultra-Violet (UV) curing, thermal curing, infrared curing, or the like. After the curing, the molded package structure 10 is taken out of molding chase 26. In the resulting structure, as shown in FIG. 11, molding compound 46 fills the gaps between dies 22 and possibly the gaps between dies 22 and wafer 20. The top surfaces of dies 22 are exposed, with no molding compound covering dies 22.

Figure 12:
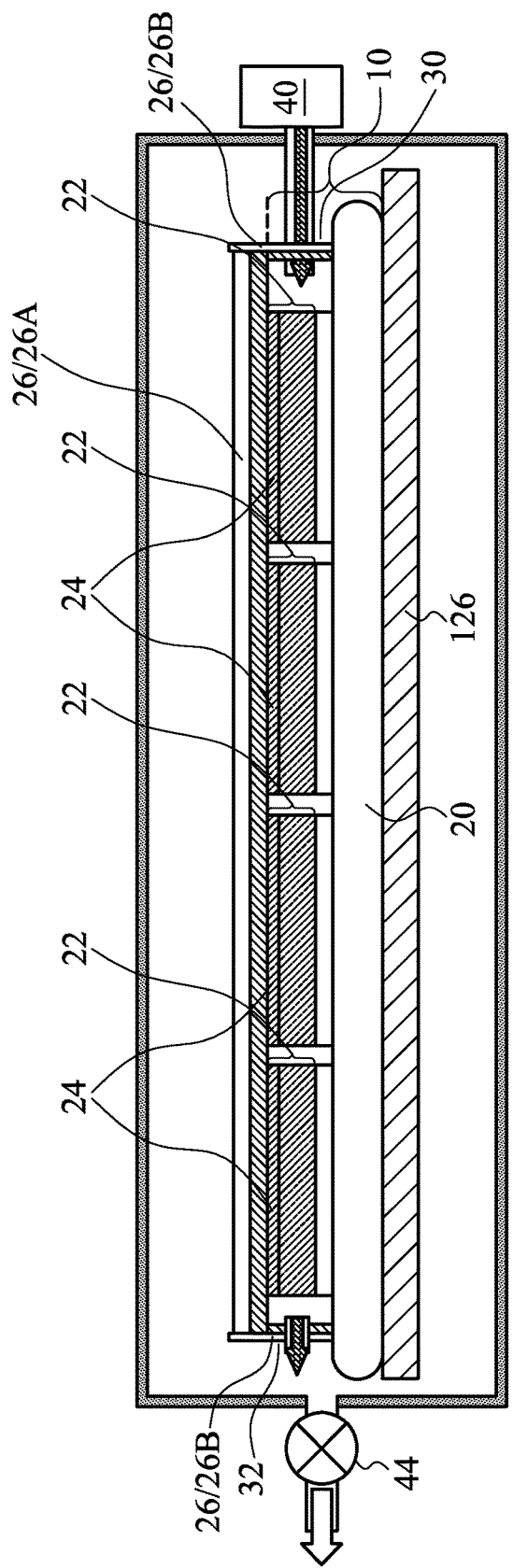
FIG. 12 illustrates a cross-sectional view of a wafer-level transfer molding process in accordance with some embodiments, wherein active components of device dies face a release film.
Figure 13:
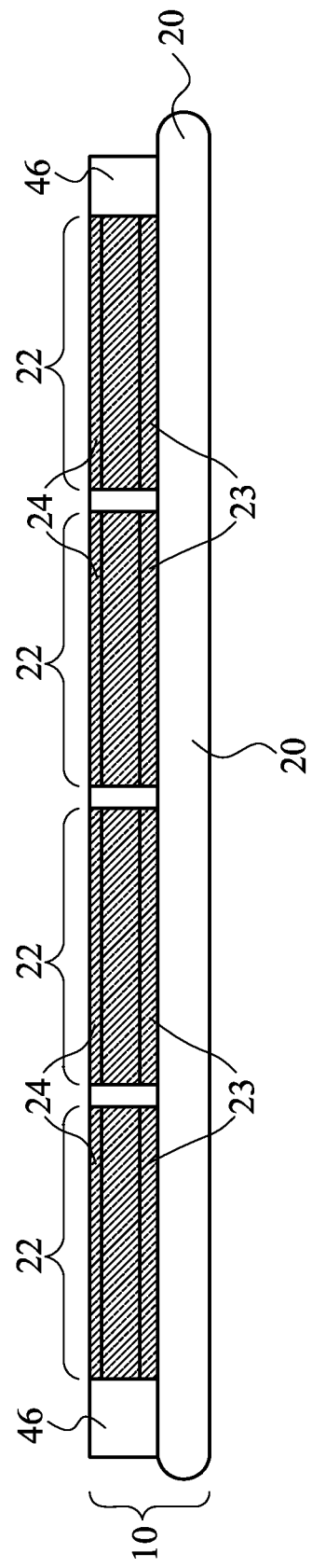
FIG. 13 illustrates a molded package structure in accordance with some embodiments, wherein active components of device dies are exposed through the resulting molded package structure.

FIGS. 12 and 13 illustrate the bonding of package structure 10 in accordance with alternative embodiments. In these embodiments, dies 22 are to be bonded as a composite wafer. Dies 22 are adhered to wafer 20, which is a carrier in these embodiments. Carrier 20 may be a silicon carrier or a non-semiconductor carrier such as a glass carrier or a ceramic carrier. When wafer 20 is a silicon wafer, it may also be a blank wafer with no circuits formed therein. Adhesives 23 adhere dies 22 to carrier 20.

In FIG. 12, package structure 10 is placed in the inner space of mold chase 26, with dies 22 facing up and in contact with release film 27. Dies 22 includes active surface components 24 facing release film 27. Surface components 24 may include metal pads, metal pillars, solder regions, redistribution lines, and/or the like, which may be exposed and in contact with release film 27. Next, a molding process is performed using essentially the same method as discussed for FIGS. 2 through 9. After the molding process, release film 27 and mold chase 26 are removed.

FIG. 13 illustrates the resulting composite wafer, which includes package structure 10 and molding compound 46. In the resulting composite wafer, dies 22 have their active components exposed. Accordingly, additional process steps such as the formation of fan-out redistribution lines (not shown) may be performed on the composite wafer.

The embodiments of the present disclosure have some advantageous features. In the embodiments of the present disclosure, a transfer molding method is used, with a release film contacting the top surface of the dies of the package structure that is molded. In the resulting molded package, the top surfaces of the device dies are exposed without the need of performing a grinding process to expose the top surfaces of device dies 22. In addition, the molding compound fills the gaps between dies 22 and wafer 20, and hence no additional underfilling step is needed. The molding compound fills the molding chase uniformly, and the efficiency of the molding process is improved.

In accordance with some embodiments of the present disclosure, a method includes placing a package structure into a mold chase, with top surfaces of device dies in the package structure contacting a release film in the mold chase. A molding compound is injected into an inner space of the mold chase through an injection port, with the injection port on a side of the mold chase. During the injection of the molding compound, a venting step is performed through a first venting port and a second venting port of the mold chase. The first venting port has a first flow rate, and the second port has a second flow rate different from the first flow rate.

In accordance with alternative embodiments of the present disclosure, a method includes placing a package structure into an inner space of a mold chase, with top surfaces of device dies in the package structure contacting a release film in the mold chase. The mold chase includes an injection port, and a first venting port and a second venting port that have different sizes. The method further includes placing the package structure and the mold chase in a chamber, wherein each of the first venting port and the second venting port interconnects the inner space to a portion of the chamber outside of the mold chase. The chamber is vacuumed. A molding compound is injected into the inner space of the mold chase through the injection port.

In accordance with yet alternative embodiments of the present disclosure, a mold chase includes a top portion, and an edge ring having a ring-shape, wherein the edge ring is underlying and connected to edges of the top portion. The edge ring encircles an inner space under the top portion. An injection port is connected to the inner space of the mold chase. A first venting port and a second venting port are at the edge ring, wherein the first venting port has a first size and the second venting port has a second size different from the first size.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure and that they may make various changes, substitutions, and alterations herein without departing from the spirit and scope of the present disclosure.

What is claimed is:

1. A method comprising:
    placing a package structure into a mold chase, with top surfaces of device dies in the package structure contacting a release film in the mold chase;
    placing an entirety of the mold chase into a space that can be vacuumed;
    vacuuming the space so that an inner space of the mold chase is vacuumed;
    injecting a molding compound into the inner space of the mold chase through an injection port, with the injection port on a first side of the mold chase; and
    during the injecting of the molding compound, venting through a first plurality of venting ports, a second plurality of venting ports, and an additional venting port of the mold chase to portions of the space unoccupied by the mold chase, wherein the additional venting port and the injection port are aligned to a straight line, and the first plurality of venting ports and the second plurality of venting ports are symmetric with respect to the straight line, and wherein the first and the second plurality of venting ports have increasingly smaller venting rates with a reduction of respective distances from the injection port.

2. The method of claim 1, wherein the mold chase has a sidewall forming a circle, and the additional venting port and the injection port are on a diameter of the circle.

3. The method of claim 1, wherein the additional venting port is larger than the first plurality of venting ports and the second plurality of venting ports.

4. The method of claim 1, wherein the first and the second plurality of venting ports are increasingly smaller with a reduction of respective distances to the injection port.

5. A method comprising:
    placing a package structure into an inner space of a mold chase, with top surfaces of device dies in the package structure contacting a release film in the mold chase, wherein the mold chase comprises:
        an injection port on a diameter of the mold chase;
        a first plurality of venting ports on a first side of the diameter; and
        a second plurality of venting ports on a second side of the diameter, wherein the second side is opposite to the first side, and the first plurality of venting ports and the second plurality of venting ports are symmetric with respect to the diameter;
    placing the package structure and the mold chase in a chamber, wherein each of the first plurality of venting ports and the second plurality of venting ports interconnects the inner space to a portion of the chamber outside of the mold chase;
    vacuuming the chamber; and
    injecting a molding compound into the inner space of the mold chase through the injection port;
    wherein the first and the second plurality of venting ports are increasingly smaller with reduction of respective distances to the injection port.

6. The method of claim 5 further comprising placing a release film in the inner space of the mold chase, with top surfaces of devices dies of the package structure contacting the release film.

7. The method of claim 5, wherein the mold chase further comprises an additional venting port, with the additional venting port and the injection port being on opposite sides of the diameter of the mold chase, and wherein the additional venting port has a greatest size among all venting ports of the mold chase.

8. The method of claim 5 further comprising:
    curing the molding compound after the injecting the molding compound; and
    removing a package comprising the package structure and the molding compound from the mold chase.

9. The method of claim 5, wherein the package structure comprises:
    a wafer; and
    a plurality of dies over and bonded to the wafer, wherein in the injecting the molding compound, the molding compound flows from one side of the wafer to an opposite side of the wafer.

10. The method of claim 5, wherein no pump and no valve is connected to the first and the second plurality of venting ports.

11. A method comprising:
    placing a package structure into a mold chase, wherein the mold chase comprises an edge forming an edge ring having a circular top-view shape, and the edge ring comprises:
        an injection port;
        an additional venting port, wherein the injection port and the additional venting port are on a diameter of the edge ring; and
        a first plurality of venting ports, wherein venting ports in the first plurality of venting ports farther away from the injection port are larger than respective venting ports in the plurality of venting ports closer to the injection port; and
        a second plurality of venting ports, wherein corresponding ports in the first plurality of venting ports and the second plurality of venting ports are symmetric to each other with respect to the diameter, and are located on opposite sides of the diameter; and
    injecting an encapsulating material into the injection port, and simultaneously venting air out of the first and the second plurality of venting ports.

12. The method of claim 11, wherein the first and the second plurality of venting ports are exposed to a same vacuum environment, and the method further comprises vacuuming the same vacuum environment.

13. The method of claim 12, wherein the air is vacuumed out of the first and the second plurality of venting ports to the same vacuum environment without going through valves.

14. The method of claim 11, wherein the first plurality of venting ports has flow rates of air different from each other when the encapsulating material is injected.

15. The method of claim 11 further comprising vacuuming from the first and the second plurality of venting ports through different valves.

16. The method of claim 11, wherein all of venting ports on the mold chase have different sizes.

17. The method of claim 1, wherein the mold chase comprises a sidewall portion, and the additional venting port, the first plurality of venting ports, and the second plurality of venting ports are on the sidewall portion.

18. The method of claim 1, wherein ports in the first plurality of venting ports closer to the additional venting port are closer to each other than ports closer to the injection port.

19. The method of claim 1, wherein one of the first plurality of venting ports closest to the injection port has a smallest size among all venting ports on the mold chase.

* * * * *